US010801528B2

(12) United States Patent
Mezzino et al.

(10) Patent No.: US 10,801,528 B2
(45) Date of Patent: Oct. 13, 2020

(54) ADJUSTABLE STOPS ACTUATOR PISTON

(71) Applicant: Microtecnica S.r.l., Turin (IT)

(72) Inventors: Giacomo Mezzino, Piemonte (IT); Enrico Quaglia, Turin (IT)

(73) Assignee: MICROTECNICA S.R.L., Turin (IT)

( * ) Notice: Subject to any disclaimer, the term of this patent is extended or adjusted under 35 U.S.C. 154(b) by 3 days.

(21) Appl. No.: 16/289,793

(22) Filed: Mar. 1, 2019

(65) Prior Publication Data
US 2019/0309774 A1 Oct. 10, 2019

(30) Foreign Application Priority Data

Apr. 6, 2018 (EP) .................................. 18166121

(51) Int. Cl.
| | | |
|---|---|---|
| *F15B 15/24* | (2006.01) | |
| *B64C 13/40* | (2006.01) | |
| *F15B 15/28* | (2006.01) | |
| *F16H 25/20* | (2006.01) | |
| *F16H 35/00* | (2006.01) | |

(52) U.S. Cl.
CPC .............. *F15B 15/24* (2013.01); *B64C 13/40* (2013.01); *F15B 15/2823* (2013.01); *F16H 25/20* (2013.01); *F15B 2215/30* (2013.01); *F16H 25/2015* (2013.01); *F16H 2025/2059* (2013.01); *F16H 2035/006* (2013.01)

(58) Field of Classification Search
CPC ...... F15B 15/26; F15B 15/261; F15B 15/264; F15B 2015/267; F16H 2035/006; F16H 2025/2059; Y10T 74/1688

USPC ...... 92/13, 13.5, 13.51, 13.6, 13.7, 13.8, 17, 92/136; 74/10.2, 89.35, 89.37, 89.32, 74/89.33
See application file for complete search history.

(56) References Cited

U.S. PATENT DOCUMENTS

| | | | | |
|---|---|---|---|---|
| 2,417,434 A | * | 3/1947 | Mead .................. | F16H 25/2015 |
| | | | | 192/143 |
| 2,605,748 A | * | 8/1952 | Rasoletti ............... | G05G 23/00 |
| | | | | 92/5 R |
| 3,003,470 A | * | 10/1961 | Geyer ..................... | F15B 15/24 |
| | | | | 92/17 |
| 4,545,289 A | | 10/1985 | Weyer | |

(Continued)

FOREIGN PATENT DOCUMENTS

JP S58207508 A 12/1983

OTHER PUBLICATIONS

Extended European Search Report for International Application No. 18166121.6 dated Oct. 15, 2018, 7 pages.

*Primary Examiner* — Dustin T Nguyen
(74) *Attorney, Agent, or Firm* — Cantor Colburn LLP

(57) ABSTRACT

An actuator includes an actuator piston movable along an axis, a first stop member rotatable about the axis and configured to limit the movement of the actuator piston in a first direction along the axis, a second stop member movable along the axis and configured to limit the movement of the actuator piston in a second direction along the axis, wherein the first direction is opposite to the second direction. A first screw connection is present between the first stop member and the second stop member such that rotation of the first stop member about the axis causes movement of the second stop member along the axis to vary the amount by which the actuator piston can move along the axis in use.

15 Claims, 4 Drawing Sheets

(56) References Cited

U.S. PATENT DOCUMENTS

| | | | | |
|---|---|---|---|---|
| 4,984,508 A * | 1/1991 | Muller | ............... | F15B 15/24 |
| | | | | 92/13.5 |
| 5,054,372 A * | 10/1991 | Weyer | ............... | F15B 15/068 |
| | | | | 74/89 |
| 5,133,245 A * | 7/1992 | Lee | ............... | A47C 1/0244 |
| | | | | 92/13.4 |
| 6,994,312 B2 * | 2/2006 | Pauer | ............... | F02M 61/168 |
| | | | | 251/129.18 |
| 7,487,708 B2 * | 2/2009 | Harashima | ............... | F15B 15/24 |
| | | | | 92/13.6 |
| 9,518,666 B2 * | 12/2016 | Dequarti | ............... | F16K 5/10 |

\* cited by examiner

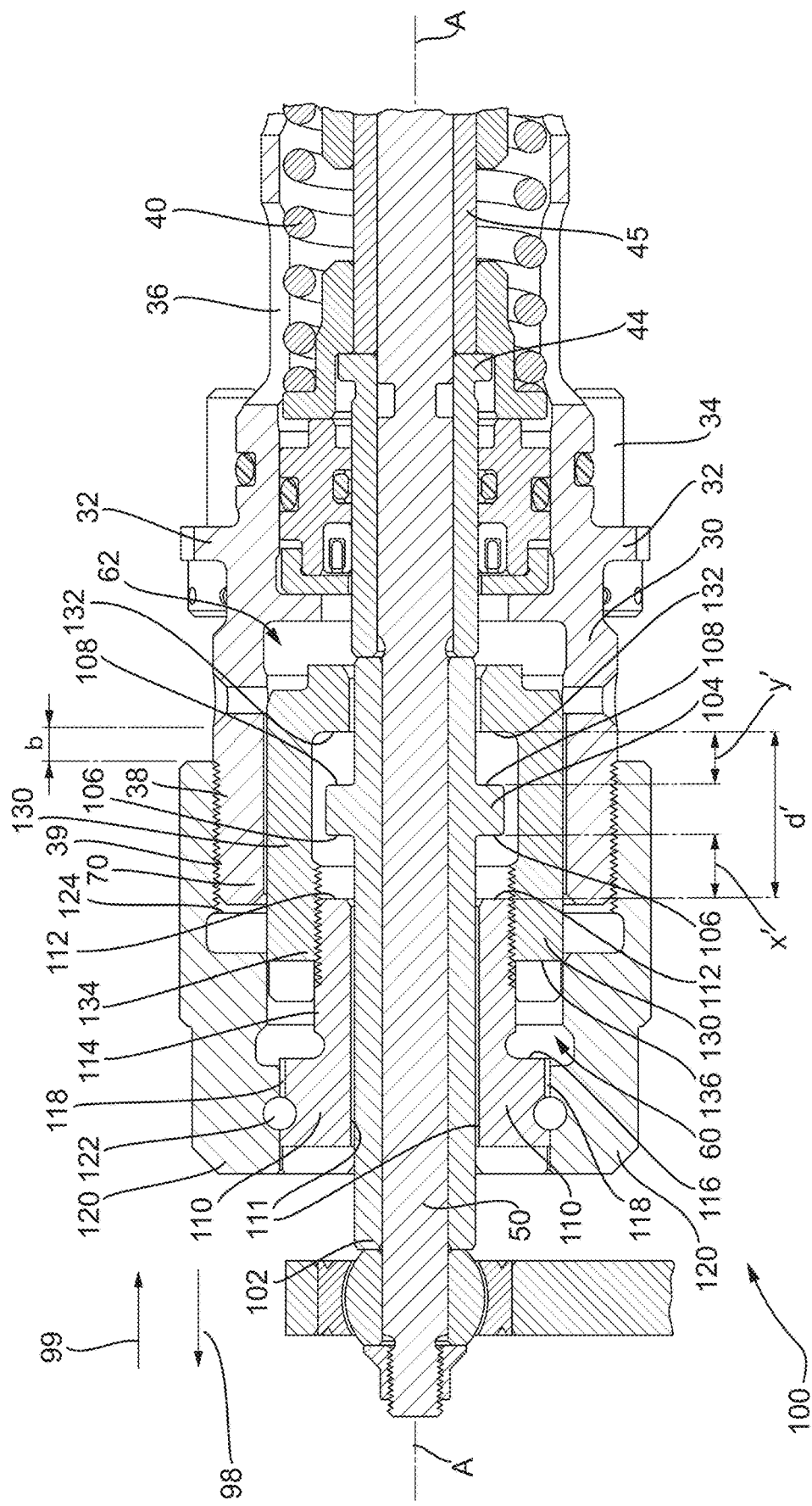

ADJUSTABLE STOPS ACTUATOR PISTON

FOREIGN PRIORITY

This application claims priority to European Patent Application No. 18166121.6 filed on Apr. 6, 2018, the entire contents of which is incorporated herein by reference.

FIELD

The present disclosure relates generally to an actuator piston comprising adjustable stops that provide a manually adjustable regulation of the physical limits of the actuator.

BACKGROUND

Recent developments for primary flight control systems and their respective actuators have pushed the development of certain controls on the actuators. Pilot commands may, for example, be merged with electrohydraulic signals to maximise stability and control on output actuator positioning. The electrical signal may be superimposed on the pilot command signal and transformed into mechanical displacement through a Stability Augmentation System ("SAS") or Stability Control Augmentation System ("SCAS"). The physical movement of these systems needs to be limited, for safety purposes.

Such limitation is typically mechanical, i.e., with physical stops (known in the art as "hardstops"), in order to ensure no electrical failure can generate a catastrophic event at airframe level.

It is desired to provide an improved actuator assembly that uses physical stops to regulate the physical limits of an actuator.

SUMMARY

In an aspect, the present disclosure provides an actuator comprising: an actuator piston movable along an axis; a first stop member rotatable about the axis and configured to limit the movement of the actuator piston in a first direction along the axis; a second stop member movable along the axis and configured to limit the movement of the actuator piston in a second direction along the axis, wherein the first direction (98) is opposition to the second direction; wherein the first stop member is connected to the second stop member via a screw connection, and the screw connection between the first stop member and the second stop member is configured such that rotation of the first stop member about the axis causes movement of the second stop member along the axis to vary the amount by which the actuator piston can move along the axis in use.

This arrangement provides an improved arrangement of stop members, or "hardstops" for the actuator assembly, by providing a screw connection between the stop members it is possible to configure the axial position of one of the stop members simply by rotating the other about the axis. For example, the second stop member may be a nut that is configured to travel along a screw thread formed in the first stop member.

The actuator may further comprise a nut rotatable about the axis. The nut may be connected to, or form part of, the first stop member, such that rotation of the nut about the axis causes a corresponding rotation of the first stop member about the axis and, in turn, movement of the second stop member along the axis as aforesaid. The nut may be integral with the first stop member, or the nut may be connected to the first stop member via, e.g., a spline connection to prevent relative translational and/or rotational movement between the nut and the first stop member.

The screw connection between the first stop member and the second stop member may be a first screw connection, the first stop member may be movable along the axis, and the nut may be connected to a fixed portion of the actuator via a second screw connection, wherein the second screw connection may be configured such that rotation of the nut about the axis causes the nut and the first stop member to move along the axis to vary the amount by which the actuator piston can move along the axis in use. For example, the nut may be configured to travel along a screw thread formed in the fixed portion of the actuator.

The second stop member may be located at least partially within a cavity that extends radially between the fixed portion of the actuator and the actuator piston.

The first screw connection and the second screw connection may be configured such that rotation of the nut about the axis causes the first stop member to move along the axis in the first direction, and the second stop member to move along the axis in the second direction.

For example, upon rotation of the nut in a first rotational direction, the nut (and the first stop member) may travel along the screw thread formed in the fixed portion of the actuator and move along the axis in the first direction. The rotation of the nut in the first rotational direction causes the first stop member also to rotate in the same rotational direction. This may cause the second stop member to travel along the screw thread formed in the first stop member and move along the axis in the second direction.

The first screw connection and the second screw connection may be configured such that a given amount of rotation of the nut about the axis causes first stop member to move along the axis in the first direction by a given distance, and the second stop member to move along the axis in the second direction by about the same distance. For example, the screw thread formed in the first stop member (along which the second stop member travels) may have a pitch that is a predetermined amount (e.g., at least 1×, 1.5× or 2×) greater than that of the screw thread formed in the fixed portion of the actuator. In some embodiments, the pitch of the screw thread formed in the first stop member (along which the second stop member travels) may be about double that of the screw thread formed in the fixed portion of the actuator, which advantageously provides symmetrical regulation of the stop members. However, in other embodiments an asymmetrical regulation may be desired, and the pitches screw threads formed in the first stop member and the fixed portion of the actuator may be tailored accordingly. For example, a ratio of the pitch of the screw thread formed in the first stop member to that of the screw thread formed in the fixed portion of the actuator may be about 1:1, 1:2, 2:1, 1:3, 3:1, 2:3. 3:2.

The first stop member and the nut may be a single, unitary piece. Alternatively, the first stop member and the nut may be separate pieces, and connected at a spline connection such that the first stop member is rotatable with the nut, i.e., the spline connection may be configured to prevent relative rotation of the first stop member and the nut. The actuator may further comprise a member configured to lock the nut axially with respect to the first stop member such that the first stop member is movable (or moves) along the axis with the nut.

The second stop member may be located at least partially within a cavity that extends radially between the first stop member and the nut and/or a cavity that extends at least partially between a static portion of the actuator and the actuator piston. The static portion of the actuator may be part of a fixed body or housing of the actuator.

The actuator may further comprise a lock member in the form of a rib that extends circumferentially around the actuator piston. The lock member may comprise a first abutment surface configured to contact the first stop member in use to define a first axial limit of the actuator piston, and a second abutment surface configured to contact the second stop member in use to define a second axial limit of the actuator piston.

The actuator may further comprise a locking sleeve located circumferentially around the actuator piston, wherein the locking sleeve comprises the lock member.

The first stop member may comprise a radially extending surface configured to contact the first abutment surface in use to define the first axial limit of the actuator piston. The second stop member may comprise a radially extending surface configured to contact the second abutment surface in use to define the second axial limit of the actuator piston.

The second stop member may be connected to a fixed portion of the actuator (e.g., the fixed portion referred to above) via a splined connection, such that the second stop member is fixed against rotation about the axis.

In an aspect, the present disclosure provides a method of adjusting the extent to which an actuator may move, wherein the actuator comprises an actuator as described above. The method comprises rotating the first stop member about the axis so as to cause the second stop member to move along the axis and vary the amount by which the actuator piston can move along the axis.

BRIEF DESCRIPTION OF THE DRAWINGS

Various embodiments will now be described, by way of example only, and with reference to the accompanying drawings in which:

FIG. 3B shows the detail of FIG. 3A after operation of the control assembly.

DETAILED DESCRIPTION

Figure 1:
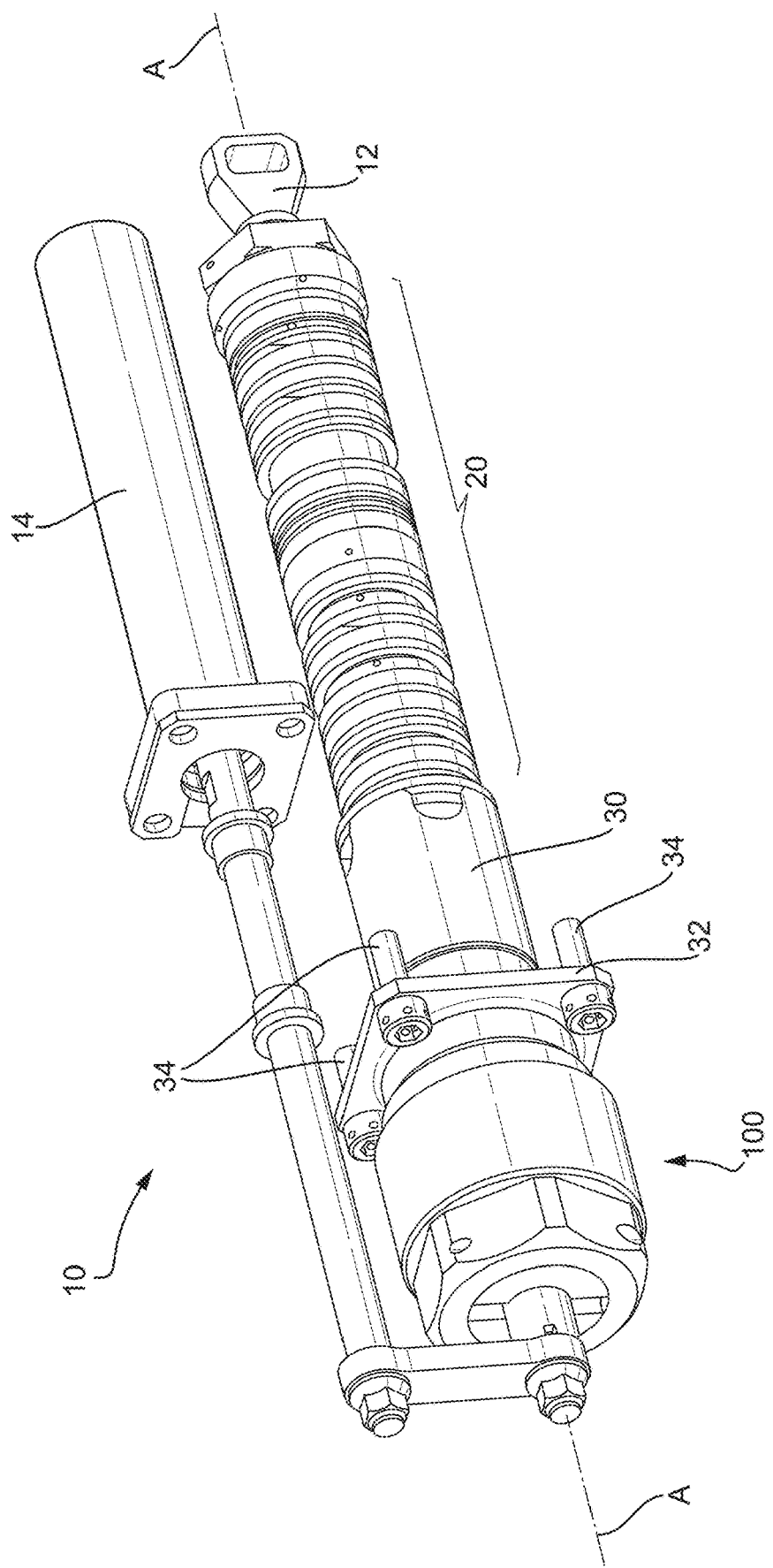
FIG. 1 shows a perspective view of an actuator in accordance with an embodiment of the present disclosure.

FIG. 1 shows an actuator 10 in accordance with an embodiment of the present disclosure. The actuator 10 is a linear actuator and comprises an actuator piston 50 (shown in FIG. 2) that extends along its central, longitudinal axis A, and which leads to an actuating member 12 for actuating a component. The component may be, for example, a flight control surface of an aircraft. The component that is moved by the actuating member 12 may be directly or indirectly connected to a flight control surface. If indirectly connected, the component may, for example, be used to move a hydraulic valve that controls a main piston connected to a flight control surface.

Although a hydraulic actuator is shown, the technology of the present disclosure can be applied also to any suitable actuator that requires stop members or "hardstops", for example electrical/pneumatic/piezo actuators, etc.

A hydraulic portion 20 of the actuator may, in use, be surrounded by further components (not shown) and may be configured to receive hydraulic fluid in order to move the actuator piston 50 and actuating member 12 along the axis A. The operation of this is not critical to the present disclosure, and is known in the art and will not be described in detail herein.

A Linear Variable Differential Transformer ("LVDT") 14 may be provided as a means to measure the displacement of the actuator. This is a common type of electromechanical transducer that is configured to convert the linear motion of the actuator (to which it is coupled) mechanically into a corresponding electrical signal that can be used to measure the displacement.

A control assembly 100 is provided to limit the axial movement of the actuator piston 50 (i.e., along the axis A) in use. This will be described in more detail below.

The actuator 10 comprises a fixed body 30 that extends between the hydraulic portion 20 and the control assembly 100 of the actuator 10. The body 30 comprises a flange 32 for connecting to a fixed assembly, e.g., an aircraft assembly or an aircraft. The flange 32 has a substantially square profile and comprises four connectors 34 at each corner of the flange 32. The body 30 may be fixed in position relative to the assembly using the flange 32 and connectors 34. Other profiles and connecting methods may be used to fix the actuator 10 in position in a given application.

Figure 2:
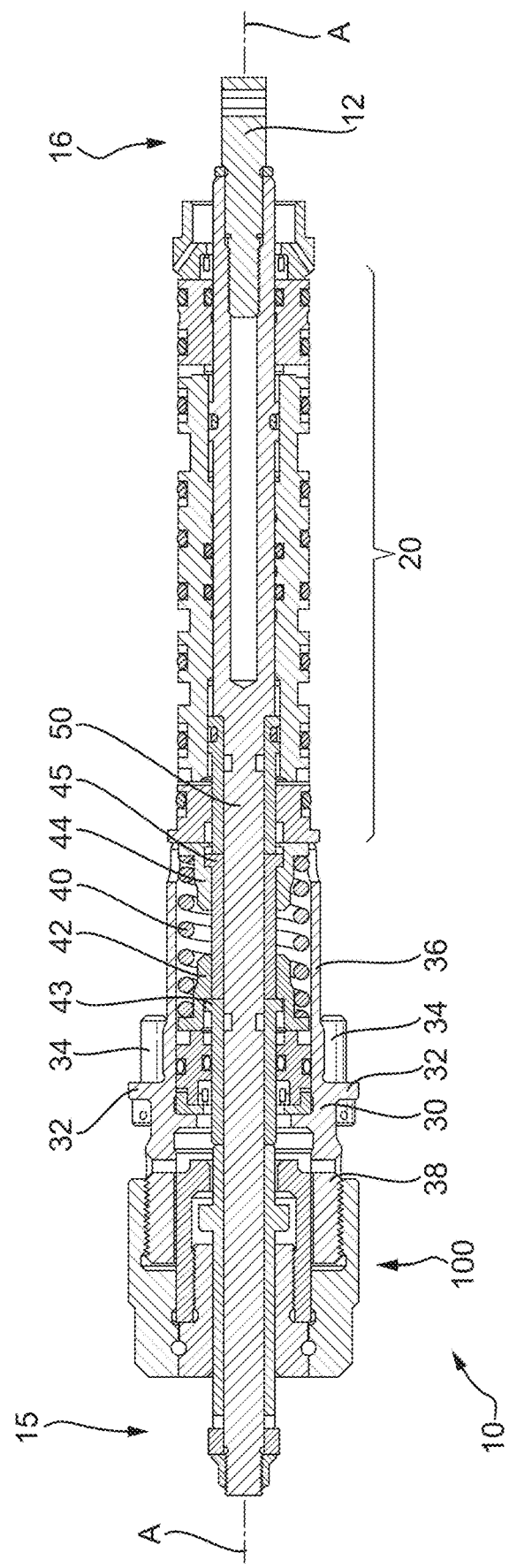
FIG. 2 shows a cross-sectional view of the actuator of FIG. 1.

FIG. 2 shows a cross-section of the actuator 10 showing in more detail the components of the actuator 10.

In particular, the actuator piston 50 is shown as extending from a first end 15 of the actuator to a second, opposite end 16. In the illustrated embodiment the control assembly 100 is provided at the first end 15, and the actuating member 12 is provided at the second end 16. In the broadest aspects of the disclosure, however, these components may be located elsewhere along the length of the actuator 10.

As described above, movement of the actuator piston 50 causes a corresponding movement of the actuating member 12 for actuating a component.

The fixed body 30 comprises a first axially extending portion 36 that surrounds a mechanism comprising a resilient member 40 (e.g., spring) that biases a first movable abutment 42 and a second movable abutment 44 in opposing directions. Movement of the actuator piston 50 in a first direction causes corresponding movement of the first movable abutment 42 (via a first sleeve 43), and movement of the actuator piston 50 in a second, opposite direction causes corresponding movement of the second movable abutment 44 (via a second sleeve 45).

As will be appreciated, the resilient member 40 is configured to resist movement of the actuator piston 50 away from its rest position (as shown in FIG. 2). As such, the mechanism formed by these components acts to centre the actuator piston 50 and keep it in its rest position, for example upon loss of power or hydraulic fluid.

The fixed body 30 comprises a second axially extending portion 38 that extends in a direction opposite to the first axially extending portion 36 and forms part of the control assembly 100.

Figure 3A:
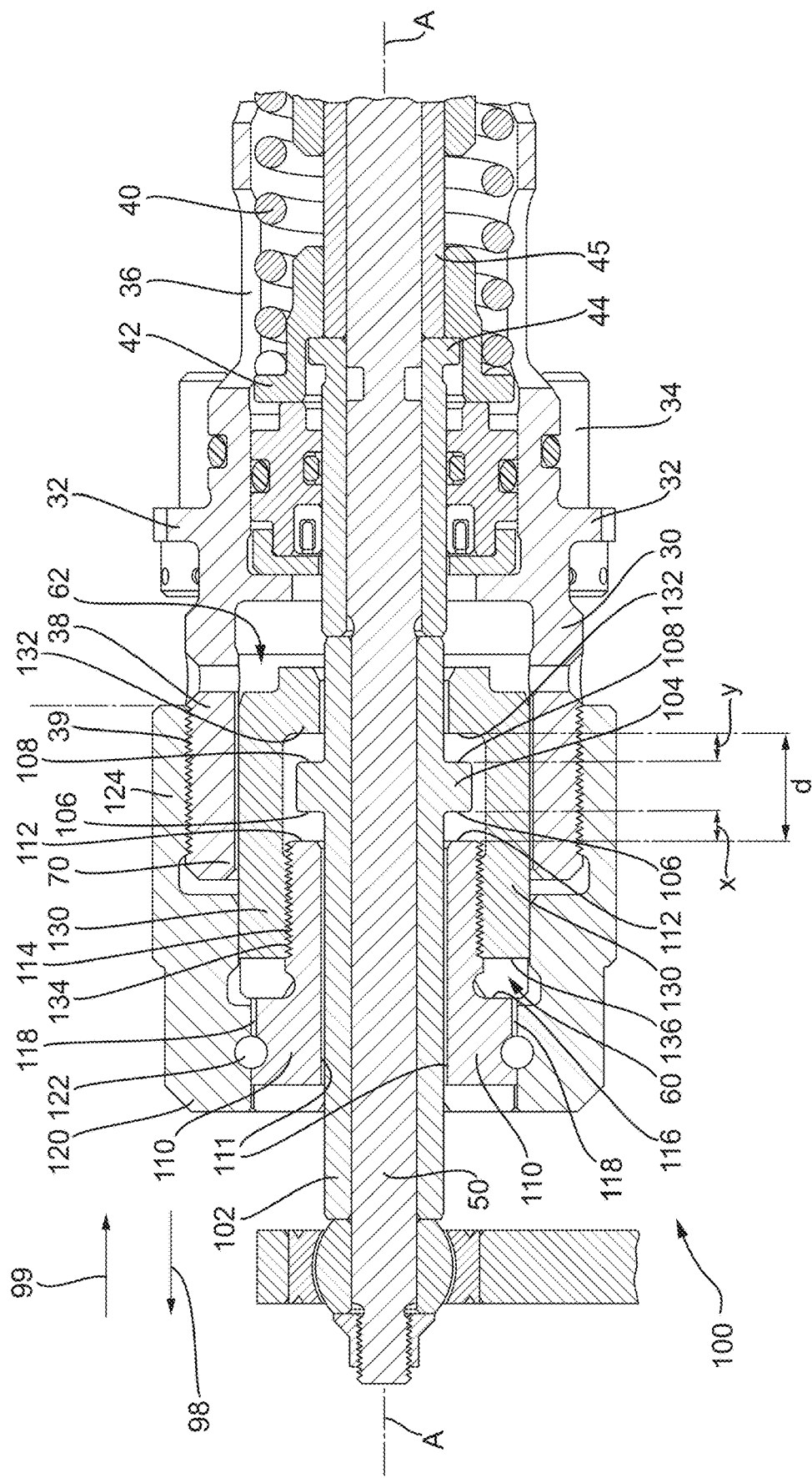
FIG. 3A shows a detailed cross-sectional view of an assembly for controlling the movement of the actuator of FIG. 1.

FIG. 3A shows the control assembly 100 in more detail. The actuator piston 50 can be seen extending through the central axis A of the actuator 10, and the control assembly 100 is located circumferentially around the actuator piston 50.

The control assembly 100 comprises a locking sleeve 102. The locking sleeve 102 is located concentrically around the actuator piston 50 and is configured to move with the actuator piston 50, such that movement of the actuator piston 50 causes a corresponding movement of the locking sleeve 102. The locking sleeve 102 comprises a lock member in the form of a flange or rib 104 that extends around the locking sleeve 102 in a circumferential direction relative to the axis A, which also forms the longitudinal axis of the locking sleeve 102.

It is envisaged that the lock member could be provided by means other than a rib on the locking sleeve 102. For example, a suitable lock member may form part of the actuator piston 50, instead of a separate locking sleeve 102. As such, the use of a locking sleeve 102 as shown should not be regarded as essential to the broadest aspects of the present disclosure The lock member (i.e., flange 104) comprises a first abutment surface 106 and a second abutment surface 108, which abutment surfaces 106, 108 face in opposite axial directions and are configured to control or limit the axial movement of the actuator piston 50, i.e., along axis A, as described in more detail below.

A first stop member 110 surrounds the actuator piston 50 and is configured such that the actuator piston 50 slides through an inner cylindrical surface 111 of the first stop member 110 in use. It should be noted that the actuator piston 50 may not contact the inner cylindrical surface 111 of the first stop member 110. The first stop member 110 is located concentrically around the locking sleeve 102, and comprises a radially extending surface 112 that is configured to face, and abut in use (e.g., contact), the first abutment surface 106 of the locking sleeve 102.

The radially extending surface 112 of the first stop member 110 is, therefore, configured to limit the axial movement of the actuator piston 50 in a first axial direction 98, since the first abutment surface 106 of the actuator piston 50 cannot move axially past the radially extending surface 112 in use.

The first stop member 110 is connected to an outer nut 120 and is configured to move axially, and rotate with the nut 120. That is, the nut 120 is able to rotate and the first stop member 110 rotates with the nut 120, through the use of a spline connection 118 between the nut 120 and the first stop member 110. One or more pins 122 may be located between the first stop member 110 and the nut 120 and may be configured to lock these components against relative rotational and/or axial movement therebetween.

Various arrangements other than a spline connection 118 and/or pins 122 may be used to axially or rotationally lock the outer nut 120 and the first stop member 110 in this manner, e.g., a suitable bearing arrangement.

The outer nut 120 extends from its connection to the first stop member 110 at a first end thereof to a second, opposite end, which comprises a screw thread 124 that engages with a cooperating screw thread 39 on the second axially extending portion 38 of the fixed body 30.

As a result of this screw connection, rotation of the outer nut 120 causes it to travel along the screw thread 39 of the fixed body 30 and move in an axial direction (i.e., in the direction of axis A). This, in turn, causes the first stop member 110 to correspondingly move in an axial direction, which changes the axial position of the radially extending surface 112 thereof. In this manner, the extent to which the actuator piston 50 may move in the first axial direction 98 may be varied (e.g., increased or decreased) by rotating the nut 120.

The control assembly 100 further comprises a second stop member 130 that is located concentrically around the actuator piston 50 and comprises a radially extending surface 132 that is configured to face, and abut in use (e.g., contact), the second abutment surface 108 of the locking sleeve 102.

The radially extending surface 132 is, therefore, configured to limit the axial movement of the actuator piston 50 in a second axial direction 99, since the second abutment surface 108 of the actuator piston 50 cannot move axially past the radially extending surface 132 in use.

The second stop member 130 comprises a screw thread 134 that engages with a cooperating screw thread 114 located on the first stop member 110. In addition, the second stop member 130 is splined to a ring member 70 that is fixed against rotation. In the illustrated embodiment, the ring member 70 forms a radially inner part of the second axially extending portion 38 of the fixed body 30. In this manner, the second stop member 130 may be seen as a nut that travels along the screw thread 114 of the first stop member 110.

As a result, rotation of the first stop member 110 (e.g., caused by rotation of the outer nut 120) causes the second stop member 130 to move axially in the second axial direction 99, which changes the axial position of the radially extending surface 132 thereof. In this manner, the extent to which the actuator piston 50 may move in the second axial direction 99 may also be varied (e.g., increased or decreased) by rotating the nut 120.

The screw connection between the first stop member 110 and the second stop member 130 may have a pitch that is larger (e.g., about twice) than that of the screw connection between the outer nut 120 and the fixed body 30.

As the outer nut 120 is rotated, the first stop member 110 will move away from the flange 104 in the first axial direction 98. The rotation of the first stop member 110 causes relative axial movement between the second stop member 130 and the first stop member 110. However, if the pitch of the screw connections is the same (for example), then the second stop member 130 would not move relative to, e.g., the fixed body 30, due to the axial movement of the first stop member 110. Therefore, the pitch of the screw connection between the first stop member 110 and the second stop member 130 is optionally greater than (and may be about double) that of the screw connection between the outer nut 120 and the fixed body 30.

Providing a pitch of the screw connection between the first stop member 110 and the second stop member 130 that is double that of the screw connection between the outer nut 120 and the fixed body 30 means that rotation of the outer nut 120 causes the first and second stop members 110, 130 to move an equal distance away from the flange 104 of the locking sleeve 102. This advantageously provides symmetrical regulation of both the first stop member 110 and the second stop member 130.

The second stop member 130 sits at least partially within a cavity 60 that extends radially between the first stop member 110 and the outer nut 120, and also at least partially within a cavity 62 that extends radially between the second axially extending portion 38 and the actuator piston 50. This provides a compact arrangement of the components of the control assembly 100 such that the axial extent along the axis A is relatively small. As a further refinement of this, a portion of the outer nut 120 (i.e., comprising the screw thread 124) extends over the second axially extending portion 38 of the fixed body 30.

To further improve the compactness of the assembly, the locking sleeve 102, first stop member 110, second stop member 130 and locking nut 120 all share a common longitudinal and rotational (if applicable) axis, which is same as the longitudinal axis A of the actuator 10.

FIG. 3A shows the actuator piston 50 in a rest position, and wherein the first stop member 110 and the second stop member 130 are separated by distance d. In this position, the distance d between the first stop member 110 and the second stop member 130 is at a minimum value. That is, and as can be seen in FIG. 3A, a radially extending surface 116 of the first stop member 110 abuts an opposing radially extending surface 136 of the second stop member 130. This prevents any further movement of the radially extending surface 132 towards the opposing radially extending surface 112.

In the illustrated embodiment, the distance X between the radially extending surface 112 of the first stop member 110 and the opposing radially extending surface 106 of the flange 104 is the same as the distance Y between the radially extending surface 132 of the second stop member 130 and its opposing radially extending surface 108 of the flange 104.

Therefore, the control assembly 100 permits movement of the actuator piston 50 a limited distance along the axis A in either the first axial direction 98 or the second axial direction 99, the limited distance in each direction being equal to the distance X or Y respectively (which, in the illustrated embodiment, are equal).

FIG. 3B shows the actuator 10 of FIG. 3A after operation of the control assembly 100 to modify the distance between the first stop member 110 and the second stop member 130.

More specifically, the outer nut 120 has been rotated such that it has moved a distance b along the axis A in the first axial direction 98. This, as described above, causes the first stop member 110 to rotate and also to move along the axis A in the first axial direction 98 by the same distance b. The rotation of the first stop member 110 causes axial movement of the second stop member 130 in the second axial direction 99 and (in the illustrated embodiment) the second stop member 130 will move the same distance b in the second axial direction 99.

This increases the distances between the flange 104 and the first stop member 110 and second stop member 130. Namely, the distance X shown in FIG. 3A has now increased to X', which is equal to X+b, and the distance Y shown in FIG. 3A has now increased to Y', which is equal to Y+b. The distance between the first stop member 110 and the second stop member 130 has increased to d', which is equal to d+2b.

The present disclosure advantageously provides stop members (or "hardstops"), e.g., the first stop member 110 and the second stop member 130, that are packaged within a relatively small axial envelope. For example, as discussed the second stop member 130 sits within cavities 60, 62 formed between the first stop member 110 and the outer nut 130, and the second axially extending portion 38 and the actuator piston 50, respectively. The components of the control assembly 100 may be located on a relatively small axially extending portion (e.g., the second axially extending portion 38) of a fixed housing or body, which portion can be located around a relatively small axial extent of the actuator piston 50.

In addition, in accordance with the illustrated embodiment a symmetrical regulation of the actuator stops (e.g., the first stop member 110 and the second stop member 130) is ensured in a manner that is easily adjustable and precise.

Although the present disclosure has been described with reference to preferred embodiments, it will be understood by those skilled in the art that various changes in form and detail may be made without departing from the scope of the invention as set forth in the accompanying claims.

The invention claimed is:

1. An actuator comprising:
   an actuator piston movable along an axis;
   a first stop member rotatable about the axis and configured to limit the movement of the actuator piston in a first direction along the axis; and
   a second stop member movable along the axis and configured to limit the movement of the actuator piston in a second direction along the axis, wherein the first direction is opposite to the second direction;
   wherein the first stop member is connected to the second stop member via a screw connection, and the screw connection between the first stop member and the second stop member is configured such that rotation of the first stop member about the axis causes movement of the second stop member along the axis to vary the amount by which the actuator piston can move along the axis in use of the actuator.

2. The actuator as claimed in claim 1, further comprising:
   a nut rotatable about the axis, wherein the nut is connected to, or forms part of the first stop member such that rotation of the nut about the axis causes a corresponding rotation of the first stop member about the axis and, in turn, movement of the second stop member along the axis.

3. The actuator as claimed in claim 2, wherein the screw connection between the first stop member and the second stop member is a first screw connection, the first stop member is movable along the axis, and the nut is connected to a fixed portion of the actuator via a second screw connection, wherein the second screw connection is configured such that rotation of the nut about the axis causes the nut and the first stop member to move along the axis to vary the amount by which the actuator piston can move along the axis in use of the actuator.

4. The actuator as claimed in claim 3, wherein the second stop member is located at least partially within a cavity that extends radially between the fixed portion of the actuator and the actuator piston.

5. The actuator as claimed in claim 3, wherein the first screw connection and the second screw connection are configured such that rotation of the nut about the axis causes the first stop member to move along the axis in the first direction, and the second stop member to move along the axis in the second direction.

6. The actuator as claimed in claim 3, wherein the first screw connection and the second screw connection are configured such that a given amount of rotation of the nut about the axis causes first stop member to move along the axis in the first direction by a given distance, and the second stop member to move along the axis in the second direction by about the same distance.

7. An actuator as claimed in claim 2, wherein the first stop member and the nut are a single, unitary piece.

8. The actuator as claimed in claim 2, wherein the first stop member and the nut are separate pieces, and are connected at a spline connection such that the first stop member is rotatable with the nut.

9. The actuator as claimed in claim 8, further comprising a member configured to lock the nut axially with respect to the first stop member such that the first stop member is movable along the axis with the nut.

10. The actuator as claimed in claim 2, wherein the second stop member is located at least partially within a cavity that extends radially between the first stop member and the nut or a cavity that extends at least partially between a static portion of the actuator and the actuator piston.

11. The actuator as claimed in claim 1, further comprising:
a lock member in the form of a rib that extends circumferentially around the actuator piston, wherein the lock member comprises:
   a first abutment surface configured to contact the first stop member in use of the actuator to define a first axial limit of the actuator piston; and
   a second abutment surface configured to contact the second stop member in use of the actuator to define a second axial limit of the actuator piston.

12. The actuator as claimed in claim 11, further comprising a locking sleeve located circumferentially around the actuator piston, wherein the locking sleeve comprises the lock member.

13. The actuator as claimed in claim 11, wherein:
the first stop member comprises a radially extending surface configured to contact the first abutment surface in use of the actuator to define the first axial limit of the actuator piston; and
the second stop member comprises a radially extending surface configured to contact the second abutment surface in use of the actuator to define the second axial limit of the actuator piston.

14. The actuator as claimed in claim 1, wherein the second stop member is connected to a fixed portion of the actuator via a splined connection, such that the second stop member is fixed against rotation about the axis.

15. A method of adjusting the extent to which an actuator may move, wherein the actuator is an actuator as claimed in claim 1, the method comprising:
   rotating the first stop member about the axis so as to cause the second stop member to move along the axis and vary the amount by which the actuator piston can move along the axis.

* * * * *